March 10, 1970 V. MILEWSKI ET AL 3,499,352
AUTOMATIC BORING BAR ADJUSTMENT MEANS
Filed April 18, 1968      2 Sheets-Sheet 1

INVENTORS
VICTOR MILEWSKI
TERRY L. SLETTEN
BY Farley Forster Farley
ATTORNEYS

March 10, 1970 V. MILEWSKI ET AL 3,499,352
AUTOMATIC BORING BAR ADJUSTMENT MEANS
Filed April 18, 1968 2 Sheets-Sheet 2

INVENTORS
VICTOR MILEWSKI
TERRY L. SLETTEN
BY
Farley Foster Farley
ATTORNEYS

United States Patent Office 3,499,352
Patented Mar. 10, 1970

3,499,352
AUTOMATIC BORING BAR ADJUSTMENT MEANS
Victor Milewski, Birmingham, and Terry L. Sletten, Westland, Mich., assignors to The Valeron Corporation, a corporation of Michigan
Filed Apr. 18, 1968, Ser. No. 722,448
Int. Cl. B23b *29/02, 51/00;* B23d *77/00*
U.S. Cl. 77—58                                           12 Claims

ABSTRACT OF THE DISCLOSURE

A boring bar including an axially reciprocal member for radially setting the cutting diameter of the tool and having means for automatically adjusting the relative axial disposition thereof between end and intermediate shoulder stopped positions for selective retraction and/or compensating adjustments as required thereof.

BACKGROUND OF THE INVENTION

Boring bars are generally known with cutter cartridges on their outer periphery and with means for individually or collectively adjusting them radially to relocate the indexible insert cutters they carry as necessary for sizing and to compensate for tool wear. The adjustment is manually made and the tool must be stopped to make the change. The cutting diameter of the tool cannot be changed, nor can the cutters be retracted, in being withdrawn from a newly formed bore, while the tool is in use.

In the copending patent application U.S. Ser. No. 626,087, filed Mar. 27, 1967, means are shown and taught for radially adjusting boring bar cutter cartridges automatically and without stopping the tool. The particular embodiment therein shown and described makes use of a reciprocal rod through the machine tool spindle, and suggests like means within the tool body itself, which may be actuated while the tool is in service to move a cam surfaced member that in turn effects a radial adjustment of the cutter cartridges. The linear stroke of the rod or like actuating means determines the extent to which the cutters are retracted and to which the cutting diameter of the tool may be changed.

What remains to be shown is how the amount of the radial adjustment may be closely controlled for close tolerance variations, as in sizing and compensating for tool wear, within the range of adjustment afforded in retracting the cutters, how this may be accomplished within a relatively short linear work stroke, and how both retraction and controlled radial adjustment may be obtained through a single actuating means within the body of the work tool itself.

SUMMARY OF THE INVENTION

The present invention relates to boring bars and like cutting tools and more particularly to a means and method for accomplishing the objective last mentioned.

In the illustrated embodiment of the invention, an axially reciprocal member in the tool body, and having a cam adjustment surface, is used to retract and radially adjust the cutter cartridges. It is biased against a shoulder stop that is in turn axially adjustable so that the relative axial location of the cam adjustment surface may be varied to change the radial disposition of the cartridge cutters. Both the shoulder stop and axially reciprocal member are separately actionable so that either or both retraction and adjustment are afforded by the same means within the tool body.

The particular means shown for varying the shoulder stop position includes a sprag clutch with a helix drive connection for turning a sleeve with a cam surfaced end face, serving as the shoulder stop, through short indexing steps. The sprag clutch member moves axially in turning the sleeve and is responsive to a spindle rod actuator or the like having a relative short linear work stroke.

Any means for automatically varying the shoulder stop position of the axially reciprocal member will obtain the desired result. The shoulder stop wall may be repositionable axially, or be indexed by rotation. The indexing stop may be on the reciprocal member. The reciprocal member may be turned and include a cam surfaced shoulder wall. As long as the reciprocal member is actionable to retract the cutters and its shoulder stopped position determines the radial adjustment of the cutters, both retraction and radial adjustment may be obtained by a like or the same actuating movement within the work tool body.

DETAILED DESCRIPTION OF THE INVENTION

Figure 1:
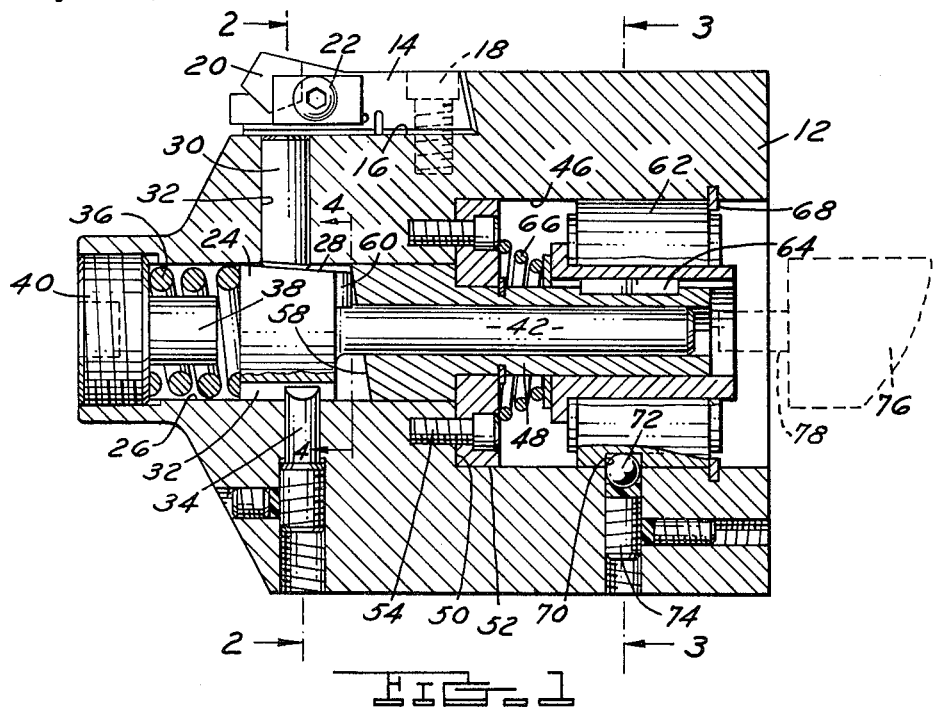
FIG. 1 is a cross-sectional side elevation view of a boring bar including the features of this invention.

A single point boring bar 10 is shown in the drawing figures but is in no way intended as restricting the invention to single point cutting tools.

The tool body 12 is cylindrical in shape and includes a cutter cartridge 14 provided on its outer periphery within a receptive seat 16 and retained by a fastener 18, near one end. A throw-away type cutting insert 20 is held by a clamp 22 on the cartridge and also enables it to be indexed as desired. The cutting insert is disposed forward on the cartridge and the cartridge is made to be lifted at its leading end and flexed enough to vary the cutting diameter that the insert provides for the tool.

An axially adjustable member 24 is provided in a center bore passage 26 in the tool body and has the forwardly disposed end thereof located relatively under the leading end of the cutter cartridge 14. It includes an inclined plane surface 28 on one side and on which bears a pin 30 in a radial bore 32 intersecting the cartridge seat 16 and center bore passage 26. Axial adjustment of member 24 thus causes cam adjustment of pin 30 and radial adjustment of the cutting insert carried by the cutter cartridge 14 against the bias in flexing the cartridge member.

Although a single plane surface cam adjustment face 28 is shown on the axially reciprocal member 24, like surfaces circumferentially spaced can be used to provide like means of adjustment in a multiple point tool, a tapered cam surface can be used, or other cam means may be provided to radially adjust cutter cartridges through the controlled actuation of the member 28 as hereinafter described.

Figure 4:
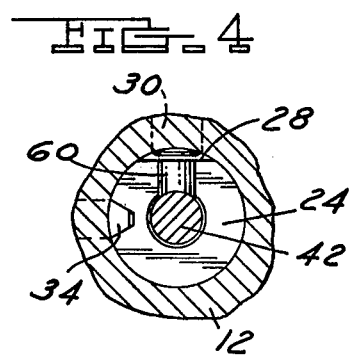
FIG. 4 is a fragmentary cross-sectional view of the end of the axially adjustable member as seen in the plane of line 4—4 in FIG. 1 and looking in the direction of the arrows.

When using a flat planular cam surface, or when it is otherwise desirable to restrict movement of the member 24 against rotation, a straight keyway 32 and set screw key 34, in the tool body, may be used and still afford relative freedom for axial movement. Although such a guide arrangement is shown in FIGS. 1 and 2 as opposite the radial adjustment pin 30, it is best to have it disposed as in FIG. 4 and other than under the cartridge load.

The axially adjustable member 24 is biased in a retracted position by a heavy duty spring 36, on a spring post 38 on an end closure 40 threaded in the end of the center bore passage 26, and it includes a rearwardly extending stem 42 by means of which it may be axially actuated against the bias of the spring to radially adjust the cutter cartridge 14.

Figure 3:
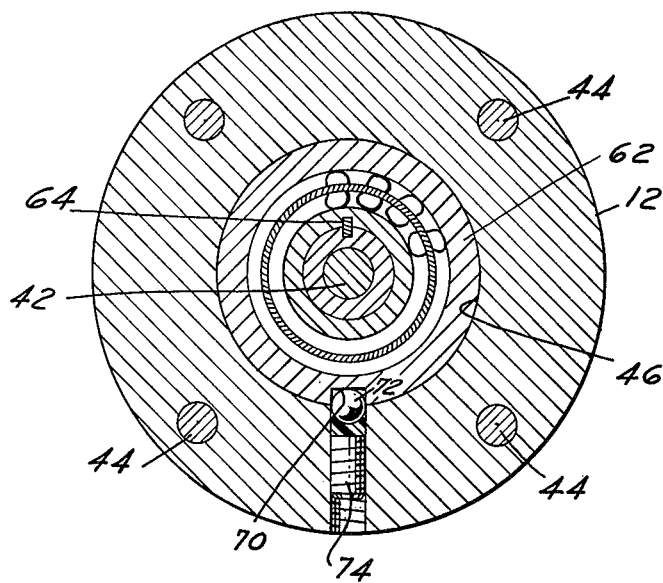
FIG. 3 is a cross-sectional view taken in the plane of line 3—3 of FIG. 1.
Figure 2:
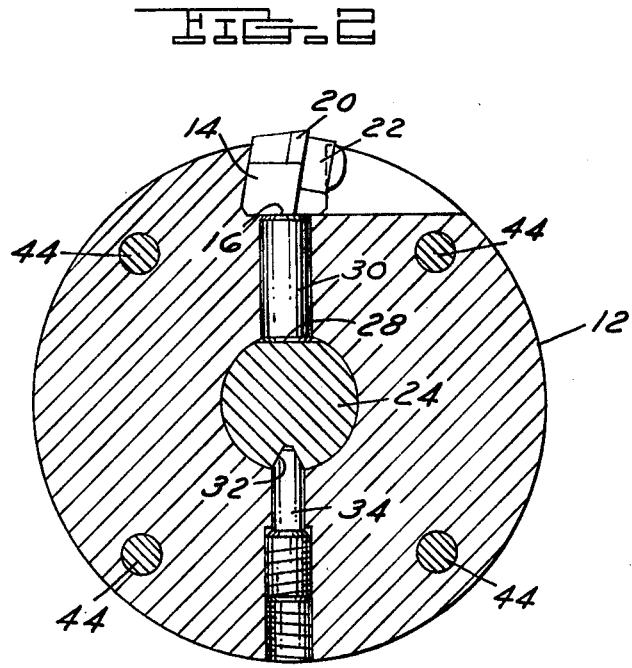
FIG. 2, on the second drawing sheet, is a cross-sectional view taken in the plane of line 2—2 of FIG. 1.

The center bore passage 26 is enlarged at the end of the tool that is fastened to the machine tool spindle, as by the through bolts 44 shown in FIGS. 2 and 3, to provide a larger passageway 46 through which a cylindrical sleeve-like member 48 extends and to afford a shoulder 50 for a ring 52 held by bolts 54 and engaged behind a shoulder flange 56 on it. This positions the leading end of member 48 within the center bore passage 26 and enables it to serve as a shoulder stop for the axially adjustable member 24 in its spring biased and retracted position, and to still allow the stem 42 to be actuated therethrough.

The end of the sleeve member 48 is cut at an inclined angle to provide a cam face 58 and a projection 60 is provided on the back side of the cam surface and axially adjustable member 24 so that rotational indexing of the sleeve member will cause the shoulder stopped position of the spring loaded member to be variable. This in turn changes the cam adjustment of the cartridge 14 by the pin 30 and the radial setting of the cutting inserts which determine the cutting diameter of the tool.

Figure 5:
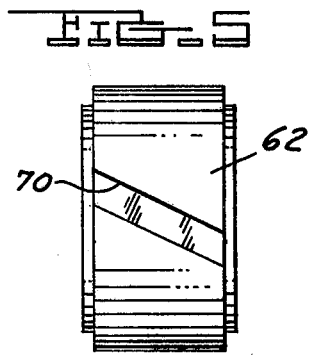
FIG. 5 is a side elevational view of the sprag clutch actuator used in the illustrated embodiment and showing the helix guide track provided thereon.

In the embodiment shown, the sleeve member 48 is indexed through arcs of about 15° by use of a sprag clutch member 62, within the enlarged passageway 46, and having it keyed to the sleeve, as at 64, to turn the sleeve while being afforded freedom of axial movement thereon. The sprag clutch member is biased by a spring 66, against a snap ring stop 68, and includes a helix guide track 70 formed in its outer surface, as best shown in FIG. 5, in which a ball detent 72 held by a set screw 74 causes it to turn as it is moved axially in the tool body. Thus, as the sprag clutch is actuated against the bias of spring 66 it turns the sleeve 48 and changes the shoulder stop position for the axially adjustable member 24 which in turn changes the radial setting of the cartridge insert.

The cutting tool disclosed, as mounted on a machine tool spindle, may provide for retraction of the cartridge cutter 20 by having means axially move the adjustable member 24, against the bias of its load spring 36, and thereafter allow it to return to its shoulder stopped position. It may also provide for radial adjustment of the insert by changing the shoulder stopped position simply by having means axially move the sprag clutch member 62 on the sleeve 48 to turn the cam faced end of the shoulder stop sleeve.

Such means may be provided within the tool body itself but in the present instance use is made of the knock-out rod 76 provided in most machine tool spindles and which is shown in phantom outline in FIG. 1, at the spindle mounted end of the tool. The spindle rod 76 is reciprocal in the machine tool spindle and relatively within the enlarged end of the tool body 12. By having a smaller cross-section end 78 that will extend into the open end of the indexing sleeve 48, to actuate the adjustment member 24, the cutter on the tool may be retracted and with a longer lineal work stroke the sprag clutch member may be actuated to index the sleeve member and change the shoulder stop position.

In instances where the axially adjustable member may be rotatably indexed, it may include the cam adjustment shoulder face and the indexing means may be directly connected to its. It also follows that the shoulder stop may be moved axially by rotational movement if provided with a helix track of its own as in having threaded engagement in the center bore passage. An axially adjustable member may be tapered to provide for cutter retraction and have eccentric lobes which vary the radial adjustment as it is indexed rotationally and numerous other combinations are foreseeable and contemplated within the spirit and scope of the invention.

Only such variations, improvements and modifications as are specifically excluded by the language of the hereafter appended claims are to be discounted and all others are to be considered as encompassed herewithin.

What is claimed is:

1. In a cutting tool having axially adjustable means for radially adjusting cutting insert cartridges to vary the cutting diameter of the tool, the method of automatically controlled cutter diameter adjustment, comprising; biasing the axially adjustable means in a shoulder stopped position determinative of the cutting diameter of the tool, and automatically adjusting the means determinative of said shoulder stopped position for varying the relative axial location of said shoulder stopped position.

2. The method of claim 1, including; automatically adjusting said means from the spindle mounted end of the tool.

3. The method of claim 1, including; adjusting said means independently of operational control over the actuation of said axially adjustable means.

4. The method of claim 1, including; rotably indexing the means determinative of said shoulder stopped position in the axial relocation thereof.

5. In a cutting tool including axially adjustable means for radially adjusting cutting insert cartridges and having means operative thereof from a shoulder stopped and biased position to automatically retract the cutting inserts of the tool, the improvement comprising; means for automatically varying the shoulder stopped and biased position from which said axially adjustable means is operative for changing the cutting diameter of the tool while turning.

6. The improvement of claim 5, said last mentioned means being operative independently and in combination with the means for retracting the cutting inserts.

7. The improvement of claim 5, including; axially reciprocal means operative of both said retracting and cutting diameter changing means.

8. In a boring bar biasing at least one radially adjustable cutter cartridge and an axially reciprocal member including a cam surface for controlled radial adjustment thereof, the improvement, comprising; a shoulder stop member and means for biasing said axially reciprocal member in engagement therewith and for axial movement relative thereto, cam means provided between said shoulder stop and axially reciprocal members for varying the relative axial location of the cam surface on said reciprocal member in the indexed rotational movement thereof, and means for automatically effecting the indexed rotational movement last mentioned.

9. The boring bar improvement of claim 8, and cam means being provided on the abutting end wall of one of said stop and reciprocal members.

10. The boring bar improvement of claim 9, including; an annular shoulder stop having said cam means provided thereon, and said reciprocal member having a head end for shoulder stop engagement and a part extending concentrically through said annular shoulder stop for independently controlled reciprocal actuation thereof.

11. The boring bar improvement of claim 10, said indexing means being responsive to lineal axial movement in the rotational indexing of said shoulder stop member.

12. The boring bar improvement of claim 10, said indexing means including a helix guided sprag clutch having indexing engagement with said annular shoulder stop member.

References Cited

UNITED STATES PATENTS 3,391,585    7/1968    Griswold et al. _____ 77—58

GERALD A. DOST, Primary Examiner

U.S. Cl. X.R.

77—76